(12) United States Patent
Kang

(10) Patent No.: US 8,000,523 B2
(45) Date of Patent: Aug. 16, 2011

(54) IMAGE PROCESSING APPARATUS AND METHOD

(75) Inventor: Bong-Su Kang, Seoul (KR)

(73) Assignee: Core Logic, Inc., Seoul (KR)

( * ) Notice: Subject to any disclaimer, the term of this patent is extended or adjusted under 35 U.S.C. 154(b) by 765 days.

(21) Appl. No.: 12/152,011

(22) Filed: May 12, 2008

(65) Prior Publication Data

US 2008/0285845 A1    Nov. 20, 2008

(30) Foreign Application Priority Data

May 11, 2007   (KR) .................. 10-2007-0046002

(51) Int. Cl.
*G06K 9/00*   (2006.01)
(52) U.S. Cl. ..................... 382/162; 382/275
(58) Field of Classification Search ........... 382/162, 382/167, 275
See application file for complete search history.

(56) References Cited

U.S. PATENT DOCUMENTS 6,724,945 B1 * 4/2004 Yen et al. .............. 382/274
7,706,609 B2 * 4/2010 Bennett et al. .......... 382/167

FOREIGN PATENT DOCUMENTS

| KR | 10-2002-0093073 | 12/2002 |
| KR | 10-2002-0093076 | 12/2002 |
| KR | 10-2006-0038681 | 5/2006 |
| KR | 10-2006-0042312 | 5/2006 |

* cited by examiner

*Primary Examiner* — Phuoc Tran
(74) *Attorney, Agent, or Firm* — Edwards Angell Palmer & Dodge LLP; Kongsik Kim

(57) ABSTRACT

An image processing apparatus according to the present invention comprises an object area extracting unit for extracting an object area including an object pixel and pixels adjacent to the object pixel from a bayer pattern image; a fault pixel judging unit for determining if the object pixel is a fault pixel based on levels of the adjacent pixels and a fault pixel judgment standard range that varies according to a level of the object pixel; and a fault pixel correcting unit for correcting the level of the object pixel determined to be a fault pixel based on a level average value of the adjacent pixels and a fault pixel correction standard range that varies according to the level average value of the adjacent pixels.

Therefore, the present invention can remove a hot pixel and noise effectively.

18 Claims, 9 Drawing Sheets

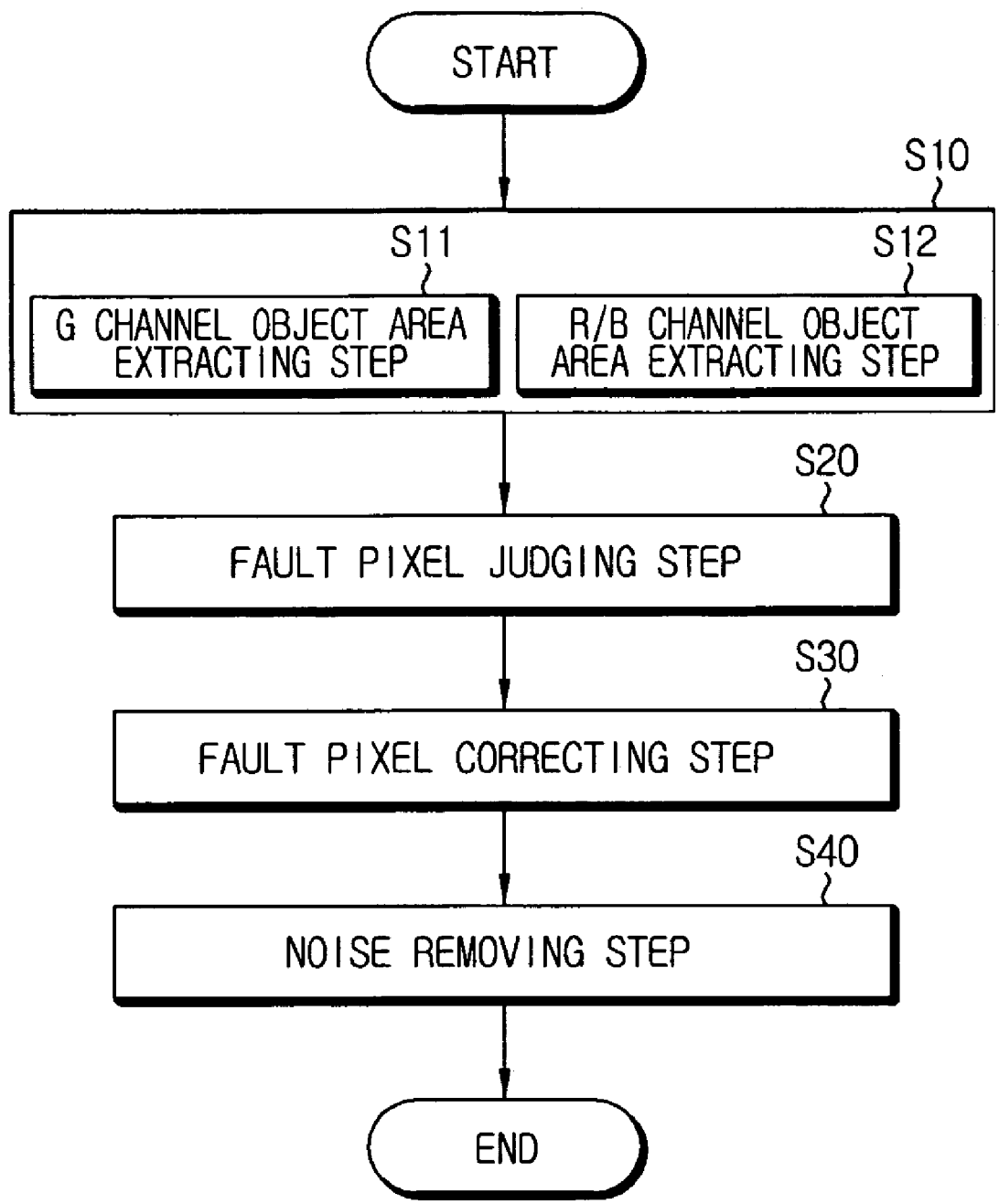

IMAGE PROCESSING APPARATUS AND METHOD

CLAIM OF PRIORITY

This application claims priority under 35 USC §119(a) to Korean Patent Application No. 10-2007-0046002, filed on May 11, 2007, in the Korean Intellectual Property Office, the entire contents of which are hereby incorporated by reference.

TECHNICAL FIELD

The present invention relates to image processing apparatus and method, and in particular, to image processing apparatus and method, which remove a fault pixel and noise of an image sensor to obtain a high quality image.

BACKGROUND

Generally, an image sensor consists of a 2-dimensional array of a plurality of pixels. Each pixel outputs an electric signal corresponding to brightness of an input light. Thus, an image for each pixel may be formed using the electric signal.

In the manufacture of the image sensor, a procedural error may cause a fault pixel such as a dead pixel or a hot pixel, thereby deteriorating the quality of the image sensor. Pixel data generated by the fault pixel is excessively larger or smaller than pixel data generated by an adjacent pixel.

Techniques for removing the hot pixel are disclosed in, for example Korean Patent Publication Nos. 1020060042312 and 1020060038681.

The above-mentioned techniques combine N number of images taken with the reduced shutter time to minimize a hot pixel that may exist in the images. The techniques have disadvantages that 1) N number of frame buffer memories are required to store a plurality of images for combining the N number of images taken with the reduced shutter time, and 2) post-processing is required, for example image stabilization to remedy shaky hands at the time of shooting or compensation for color deterioration that may occur due to the reduced shutter time.

Meanwhile, an image processing apparatus generally requires a means for removing noise in an image inputted through an image sensor.

Techniques for removing noise are disclosed in, for example Korean Patent Publication Nos. 1020020093076 and 1020020093073.

The above-mentioned techniques conduct averaging by use of differences in level between an interest pixel and adjacent pixels, and a preset standard range. According to the techniques, in the case that the standard range is improper, noise in an image is not effectively removed. That is, the techniques have disadvantages that 1) an excessively large standard range blurs out a heterogeneous region of a dark portion in an image, and 2) an excessively small standard range fails a desired removal of noise in a light portion of an image.

SUMMARY

The present invention was devised to solve the above-mentioned problems. An object of the present invention is to remove a hot pixel or noise effectively while maintaining a heterogeneous region of an input image.

And, another object of the present invention is removing a hot pixel and noise simultaneously to reduce the number of steps for image signal processing.

Also, still another object of the present invention is to remove a hot pixel and noise while ensuring heterogeneous and homogeneous regions of dark and light portions in an image to the maximum.

Further, yet another object of the present invention is removing a grid noise on each color channel existing in a bayer pattern.

These and other features, aspects, and advantages of the present invention will be more fully described in the preferred embodiments of the present invention. And, the objects and advantages of the present invention can be implemented by configurations recited in the claims singularly or in combination.

To achieve the above-mentioned objects, an image processing apparatus comprises an object area extracting unit for extracting an object area including an object pixel and pixels adjacent to the object pixel from a bayer pattern image; a fault pixel judging unit for judging if the object pixel is a fault pixel by judging if levels of the adjacent pixels correspond to a fault pixel judgment standard range that varies according to a level of the object pixel; and a fault pixel correcting unit for correcting the level of the object pixel judged as a fault pixel on the basis of a level average value of adjacent pixels corresponding to a fault pixel correction standard range that varies according to the level average value of the adjacent pixels.

Preferably, the object area extracting unit extracts an object area for each color channel.

Preferably, the object area extracting unit includes a G channel object area extracting unit for extracting an object area of a G channel; and an R/B channel object area extracting unit for extracting an object area of R and B channels.

Preferably, the fault pixel judging unit includes a fault pixel judgment standard range generating unit for adding a fault pixel judgment weight value to the level of the object pixel, the fault pixel judgment weight value being in inverse proportion to the level of the object pixel, to generate a fault pixel judgment standard range including a first maximum and a first minimum; and a comparing/judging unit for comparing the levels of the adjacent pixels with the fault pixel judgment standard range to judge if the object pixel is a fault pixel.

Preferably, the comparing/judging unit judges the object pixel as a fault pixel in the case that all the levels of the adjacent pixels are equal to or larger than the first maximum value or are equal to or smaller than the first minimum value.

Preferably, the fault pixel correcting unit includes an adjacent pixel level average value calculating unit for calculating a level average value of the adjacent pixels; a fault pixel correction standard range generating unit for adding a fault pixel correction weight value to the level average value of the adjacent pixels, the fault pixel correction weight value being in inverse proportion to the level average value of the adjacent pixels, to generate a fault pixel correction standard range including a second maximum value and a second minimum value; and a first replacing unit for replacing the level of the object pixel with a level average value of adjacent pixels having levels that are not less than the second minimum value and not more than the second maximum value.

Preferably, the image processing apparatus further comprises a noise removing unit for removing noise of the object pixel on the basis of a level average value of adjacent pixels corresponding to a noise removal standard range that varies according to the level of the object pixel.

Preferably, the noise removing unit includes a noise removal standard range generating unit for adding a noise removal weight value to the level of the object pixel, the noise removal weight value being in inverse proportion to the level of the object pixel, to generate a noise removal standard range including a third maximum value and a third minimum value; and a second replacing unit for replacing the level of the object pixel with a level average value of adjacent pixels having levels that are not less than the third minimum value and not more than the third maximum value.

Preferably, the second replacing unit adds a larger weight value to the object pixel than weight values added to the adjacent pixels.

An image processing method according to the present invention comprises an object area extracting step for extracting an object area including an object pixel and pixels adjacent to the object pixel from a bayer pattern image; a fault pixel judging step for judging if the object pixel is a fault pixel by judging if levels of the adjacent pixels correspond to a fault pixel judgment standard range that varies according to a level of the object pixel; and a fault pixel correcting step for correcting the level of the object pixel judged as a fault pixel on the basis of a level average value of adjacent pixels corresponding to a fault pixel correction standard range that varies according to the level average value of the adjacent pixels.

Preferably, in the object area extracting step, each object area for each color channel is extracted.

Preferably, the object area extracting step includes a G channel object area extracting step for extracting an object area of a G channel; and an R/B channel object area extracting step for extracting an object area of R and B channels.

Preferably, the fault pixel judging step includes a fault pixel judgment standard range generating step for adding a fault pixel judgment weight value to the level of the object pixel, the fault pixel judgment weight value being in inverse proportion to the level of the object pixel, to generate a fault pixel judgment standard range including a first maximum value and a first minimum value; and a comparing/judging step for comparing the levels of the adjacent pixels with the fault pixel judgment standard range to judge if the object pixel is a fault pixel.

Preferably, in the comparing/judging step, the object pixel is judged as a fault pixel in the case that all the levels of the adjacent pixels are equal to or larger than the first maximum value or are equal to or smaller than the first minimum value.

Preferably, the fault pixel correcting step includes an adjacent pixel level average value calculating step for calculating a level average value of the adjacent pixels; a fault pixel correction standard range generating step for adding a fault pixel correction weight value to the level average value of the adjacent pixels, the fault pixel correction weight value being in inverse proportion to the level average value of the adjacent pixels, to generate a fault pixel correction standard range including a second maximum value and a second minimum value; and a first replacing step for replacing the level of the object pixel with a level average value of adjacent pixels having levels that are not less than the second minimum value and not more than the second maximum value.

Preferably, the image processing method further comprises a noise removing step for removing noise of the object pixel on the basis of a level average value of adjacent pixels corresponding to a noise removal standard range that varies according to the level of the object pixel, wherein the noise removal judgment standard range is generated by adding a noise removal weight value to the level of the object pixel, the noise removal weight value being applied differentially according to the level of the object pixel.

Preferably, the noise removing step includes a noise removal standard range generating step for adding a noise removal weight value to the level of the object pixel, the noise removal weight value being in inverse proportion to the level of the object pixel, to generate a noise removal standard range including a third maximum value and a third minimum value; and a second replacing step for replacing the level of the object pixel with a level average value of adjacent pixels having levels that are not less than the third minimum value and not more than the third maximum value.

Preferably, in the second replacing step, a larger weight value is added to the object pixel than weight values added to the adjacent pixels.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

FIG. 11 is a view illustrating an image processing method according to an embodiment of the present invention.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Figure 1:
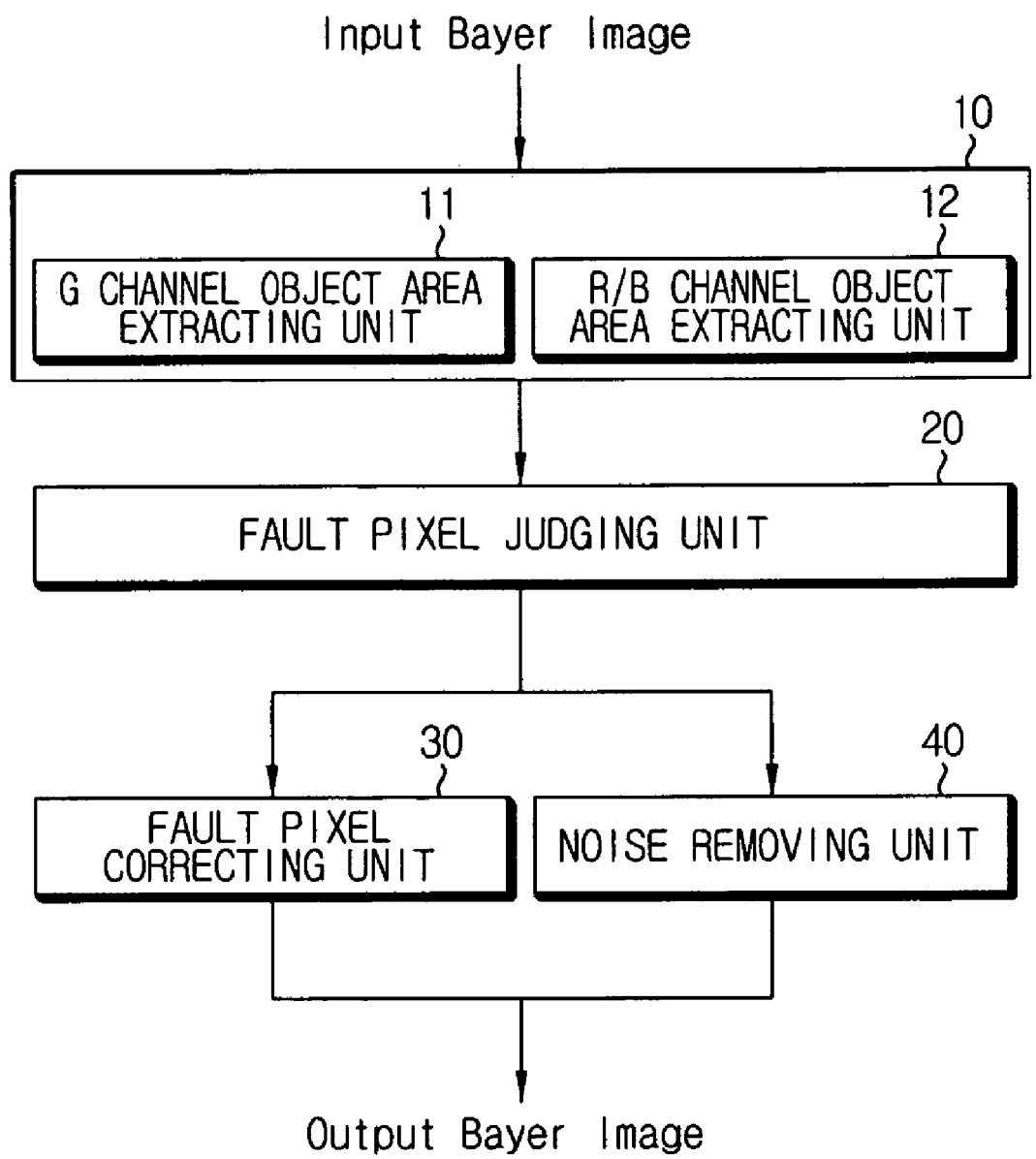
FIG. 1 is a view illustrating an image processing apparatus according to an embodiment of the present invention.

FIG. 1 is a view illustrating an image processing apparatus according to an embodiment of the present invention.

As shown in FIG. 1, the image processing apparatus according to an embodiment of the present invention comprises an object area extracting unit 10, a fault pixel judging unit 20, and a fault pixel correcting unit 30.

The object area extracting unit 10 extracts an object area from an input bayer pattern image. The object area includes an object pixel and pixels adjacent to the object pixel.

Figure 2:
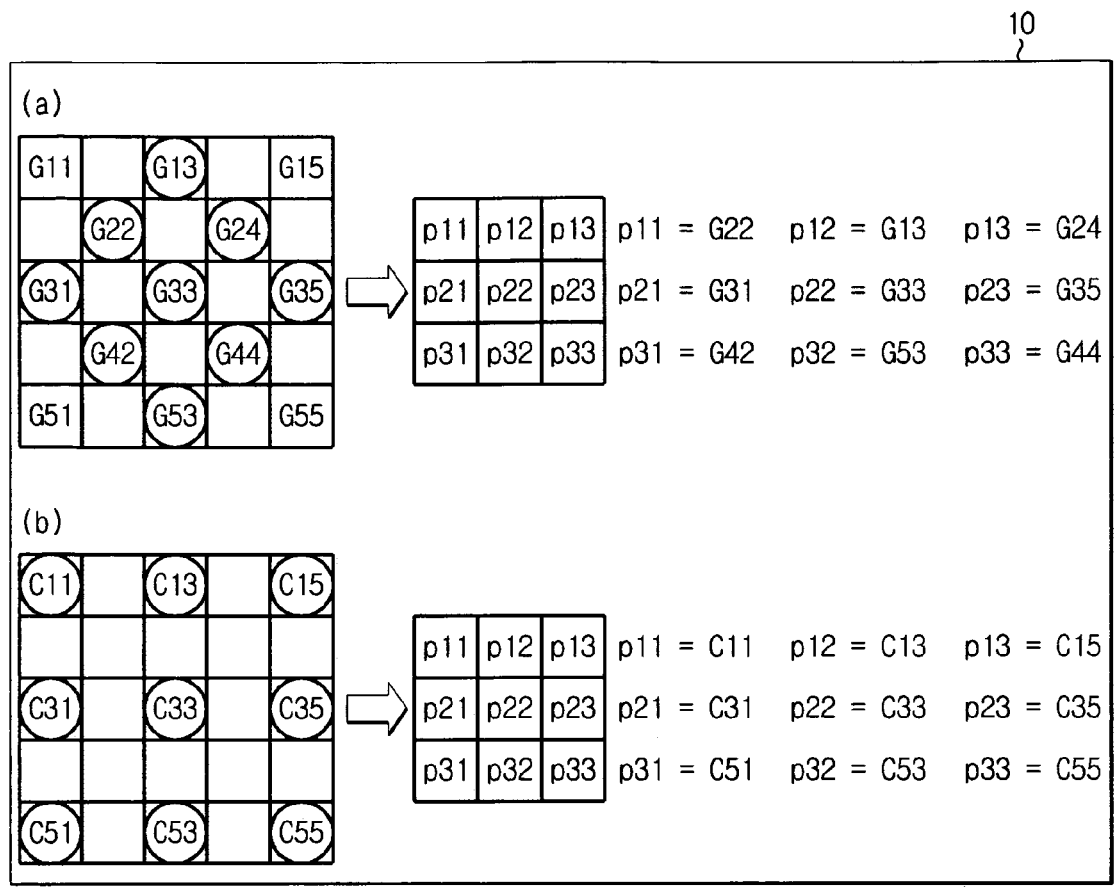
FIG. 2 is a view illustrating an object area extracting unit in the apparatus of FIG. 1.

The object area extracting unit 10 is described in detail with reference to FIG. 2. FIG. 2 is a view illustrating the object area extracting unit 10 included in the apparatus of FIG. 1.

Referring to FIG. 2, the object area extracting unit 10 extracts an object area including 9 pixels of 3×3 array from an input bayer pattern image. An object pixel is located at the center of the object area. Among the pixels in the object area, pixels other than the object pixel are adjacent pixels. Preferably, the object area extracting unit 10 extracts an object area for each color channel. The object area extracting unit 10 may include a G channel object area extracting unit 11 for extracting an object area of a G channel, and an R/B channel object area extracting unit 12 for extracting an object area of R and B channels.

FIG. 2(a) shows an object area extracted by the G channel object area extracting unit 11.

Referring to FIG. 2(a), G13, G22, G24, G31, G33, G35, G42, G44 and G53 pixels are extracted from a pixel area including 25 pixels of 5×5 array. The G channel object area consists of a matrix array of p11, p12, p13, p21, p22, p23, p31, p32 and p33. p11 is a level of G22 pixel, p12 is a level of G13 pixel, p13 is a level of G24 pixel, p21 is a level of G31 pixel, p22 is a level of G33 pixel, p23 is a level of G35 pixel, p31 is a level of G42 pixel, p32 is a level of G53 pixel, and p33 is a level of G44 pixel. In FIG. 2(a), G33 is an object pixel, and p22 is a level of the object pixel.

FIG. 2(b) shows an object area extracted by the R/B channel object area extracting unit 12.

Referring to FIG. 2(b), C11, C13, C15, C31, C33, C35, C51, C53 and C55 pixels are extracted from a pixel area including 25 pixels of 5×5 array. The R/B channel object area consists of a matrix array of p11, p12, p13, p21, p22, p23, p31, p32 and p33. C means an R or B channel, not a G channel.

Figure 3:
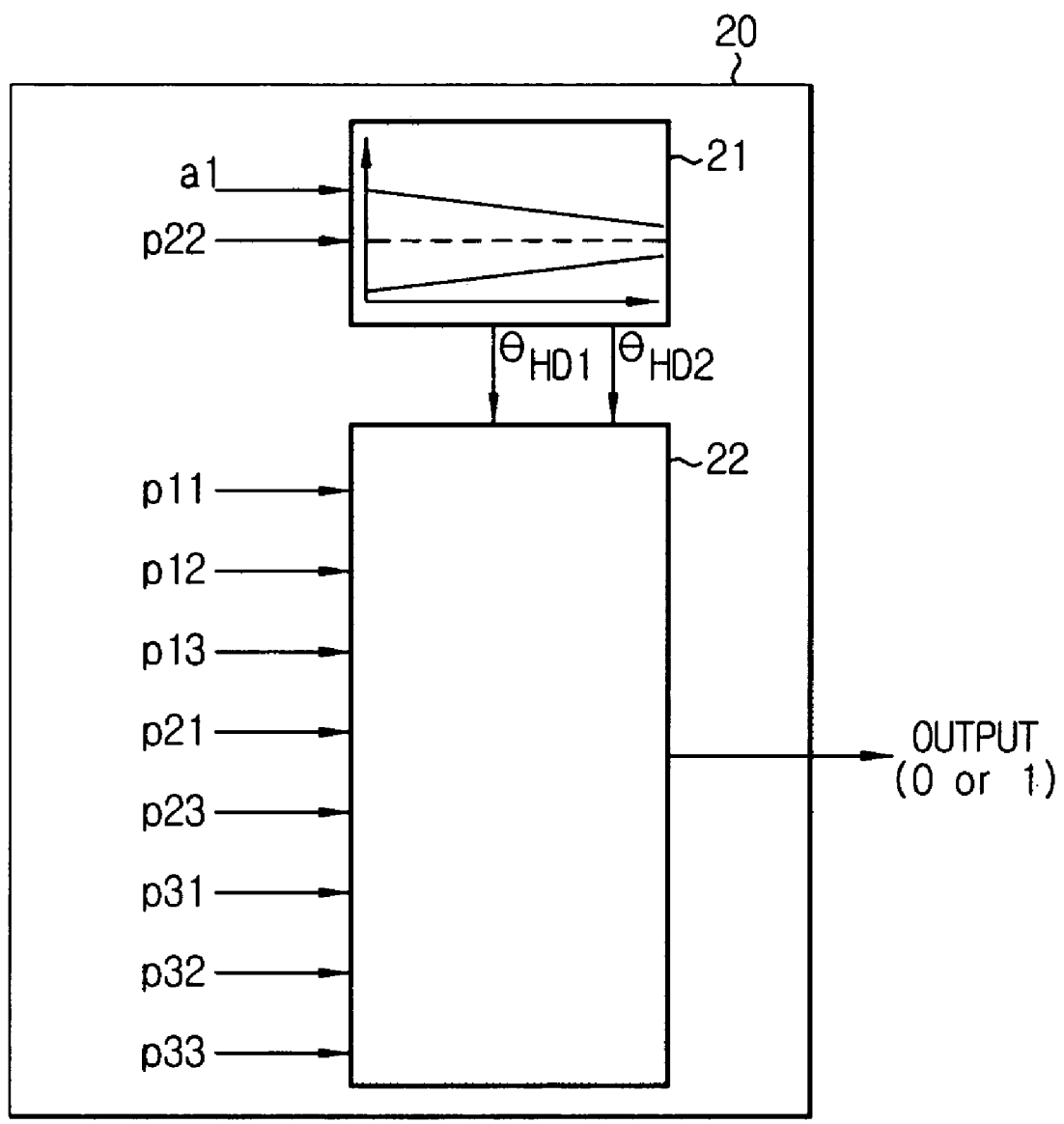
FIG. 3 is a view illustrating a fault pixel judging unit in the apparatus of FIG. 1.

The fault pixel judging unit 20 judges if the object pixel is a fault pixel on the basis of a faulty pixel judgment standard range that varies according to a level of the object pixel. The fault pixel judging unit 20 is described in detail with reference to FIG. 3. FIG. 3 is a view illustrating the fault pixel judging unit 20 included in the apparatus of FIG. 1.

Referring to FIG. 3, the fault pixel judging unit 20 includes a fault pixel judgment standard range generating unit 21 and a comparing/judging unit 22.

The fault pixel judgment standard range generating unit 21 adds a fault pixel judgment weight value (a1) to the level (p22) of the object pixel, the fault pixel judgment weight value (a1) being in inverse proportion to the level (p22) of the object pixel, to generate a fault pixel judgment standard range including a first maximum value ($\theta_{HD1}$) and a first minimum value ($\theta_{HD2}$). The fault pixel judgment weight value (a1) may be stored into a memory in the form of a lookup table. As mentioned above, the fault pixel judgment standard range generating unit 21 stores the fault pixel judgment weight value (a1) in a memory, and the fault pixel judgment standard range generating unit 21 sets a fault pixel judgment weight value (a1) corresponding to the level (p22) of the object pixel with reference to the memory, so that the fault pixel judgment standard range generating unit 21 can set a fault pixel judgment weight value (a1) adaptable to the level (p22) of the object pixel. For example, in the case that a level (p22) of the object pixel is '10', the fault pixel judgment standard range generating unit 21 refers to a fault pixel judgment weight value '0.4' corresponding to the level of the object pixel, '10'. Thus, a first maximum value, of a fault pixel judgment standard range of the object pixel having the level '10' is '10+ 10*0.4=14'. And, a first minimum value of the fault pixel judgment standard range of the object pixel having the level '10' is '10−10*0.4=6'. In the case that a level (p22) of the object pixel is '200', the fault pixel judgment standard range generating unit 21 refers to a fault pixel judgment weight value '0.1' corresponding to the level of the object pixel, '200'. Thus, a first maximum value of a fault pixel judgment standard range of the object pixel having the level '200' is '200+200*0.1=220'. And, a first minimum value of the fault pixel judgment standard range of the object pixel having the level '10' is '200−200*0.1=180'.

The comparing/judging unit 22 compares the levels (p11, p12, p13, p21, p23, p31, p32 and p33) of the adjacent pixels with the fault pixel judgment standard range ($\theta_{HD1}$, $\theta_{HD2}$) to judge if the object pixel (p22) is a fault pixel. The comparing/judging unit 22 judges the object pixel as a fault pixel in the case that all the levels of the adjacent pixels are equal to or larger than the first maximum value ($\theta_{HD1}$) or are equal to or smaller than the first minimum value ($\theta_{HD2}$). For example, when a level of the object pixel is '10', a fault pixel judgment weight value corresponding to the level of the object pixel '10' is '0.4', a first maximum value of a fault pixel judgment standard range of the object pixel having the level '10' is '14', and a first minimum value of the fault pixel judgment standard range of the object pixel having the level '10' is '6', the comparing/judging unit 22 judges the object pixel as a fault pixel in the case that all the levels of the adjacent pixels are not more than '6' and not less than '14', and does not judges the object pixel as a fault pixel in the case that all levels of the adjacent pixels are between '6' and '14'. When a level of the object pixel is '200', a fault pixel judgment weight value corresponding to the level of the object pixel, '200' is '0.1', a first maximum value of a fault pixel judgment standard range of the object pixel having the level '200' is '220', and a first minimum value of the fault pixel judgment standard range of the object pixel having the level '200' is '180', the comparing/judging unit 22 judges the object pixel as a fault pixel in the case that all levels of adjacent pixels are not more than '180' and not less than '220', and does not judges the object pixel as a fault pixel in the case that all the levels of the adjacent pixels are between '180' and '220'.

The fault pixel correcting unit 30 corrects the level of the object pixel judged as a fault pixel on the basis of a fault pixel correction standard range (a2) variable according to a level average value of the adjacent pixels.

Figure 4:
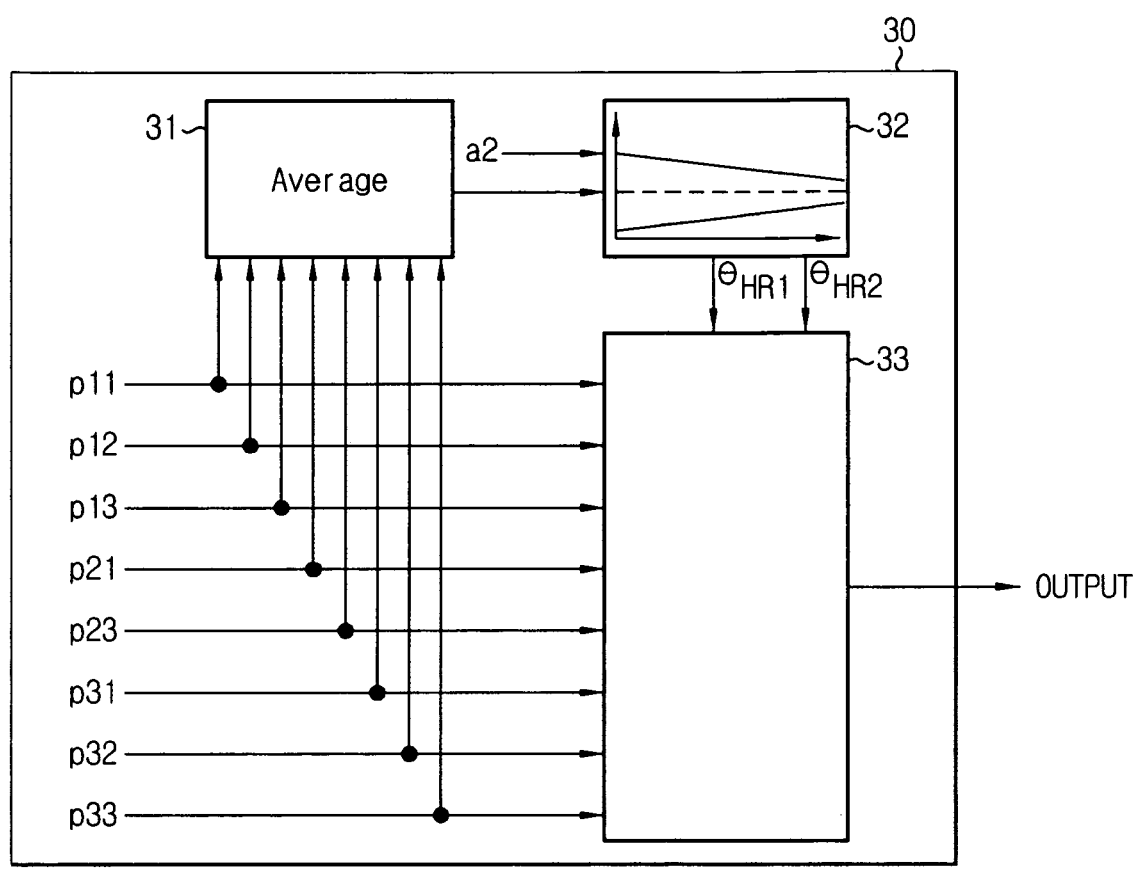
FIG. 4 is a view illustrating a fault pixel correcting unit in the apparatus of FIG. 1.

The fault pixel correcting unit 30 is described in detail with reference to FIG. 4. FIG. 4 is a view illustrating the fault pixel correcting unit 30 included in the apparatus of FIG. 1.

Referring to FIG. 4, the fault pixel correcting unit 30 includes an adjacent pixel level average value calculating unit 31, a fault pixel correction standard range generating unit 32, and a first replacing unit 33.

The adjacent pixel level average value calculating unit 31 calculates a level average value of the adjacent pixels.

The fault pixel correction standard range generating unit 32 adds a fault pixel correction weight value (a2) to the level average value of the adjacent pixels, the fault pixel correction weight value (a2) being in inverse proportion to the level average value of the adjacent pixels, to generate a fault pixel correction standard range including a second maximum value ($\theta_{HR1}$) and a second minimum value ($\theta_{HR2}$). Methods for generating the fault pixel correction weight value and the fault pixel correction standard range are substantially the same as the above-mentioned methods for generating the fault pixel judgment weight value and the fault pixel judgment standard range, and thus the detailed description of the methods for generating the fault pixel correction weight value and the fault pixel correction standard range is replaced with the detailed description of the methods for generating the fault pixel judgment weight value and the fault pixel judgment standard range, respectively.

The first replacing unit 33 replaces the level of the object pixel with the level average value of adjacent pixels having levels that are not less than the second minimum value ($\theta_{HR2}$) and not more than the second maximum value ($\theta_{HR1}$).

Hereinafter, function and operation of the fault pixel correcting unit 30 are described using actual data for convenience of understanding.

For example, in the case that p11 is '60', p12 is '70', p13 is '200', p21 is '50', p22 is '500', p23 is '50', p31 is '50', p32 is '50', and p33 is '50', a level average value of the adjacent pixels is '(60+70+200+50+50+50+50+50)/8=72.5'. In the case that a fault pixel correction weight value corresponding to the level average value of the adjacent pixels, '72.5' is '0.3', a second maximum value of a fault pixel correction standard range is '72.5+72.5*0.3=94.25', and a second minimum value of the fault pixel correction standard range is '72.5−72.5*0.3=50.9'. Thus, first replacing unit 33 replaces the level of the object pixel, '500' with a level average value of p11, p12, p21, p23, p31, p32 and p33 pixels having levels that are not less than the second minimum value '50.9' and not more than the second maximum value '94.25', i.e. '(60+70+50+50+50+50+50)/7=54'.

The image processing apparatus according to an embodiment of the present invention may further comprise a noise removing unit 40. The noise removing unit 40 removes noise of the object pixel on the basis of a noise removal standard range that varies according to the level of the object pixel.

The noise removing unit 40 is described in detail with reference to FIG. 5.

Figure 5:
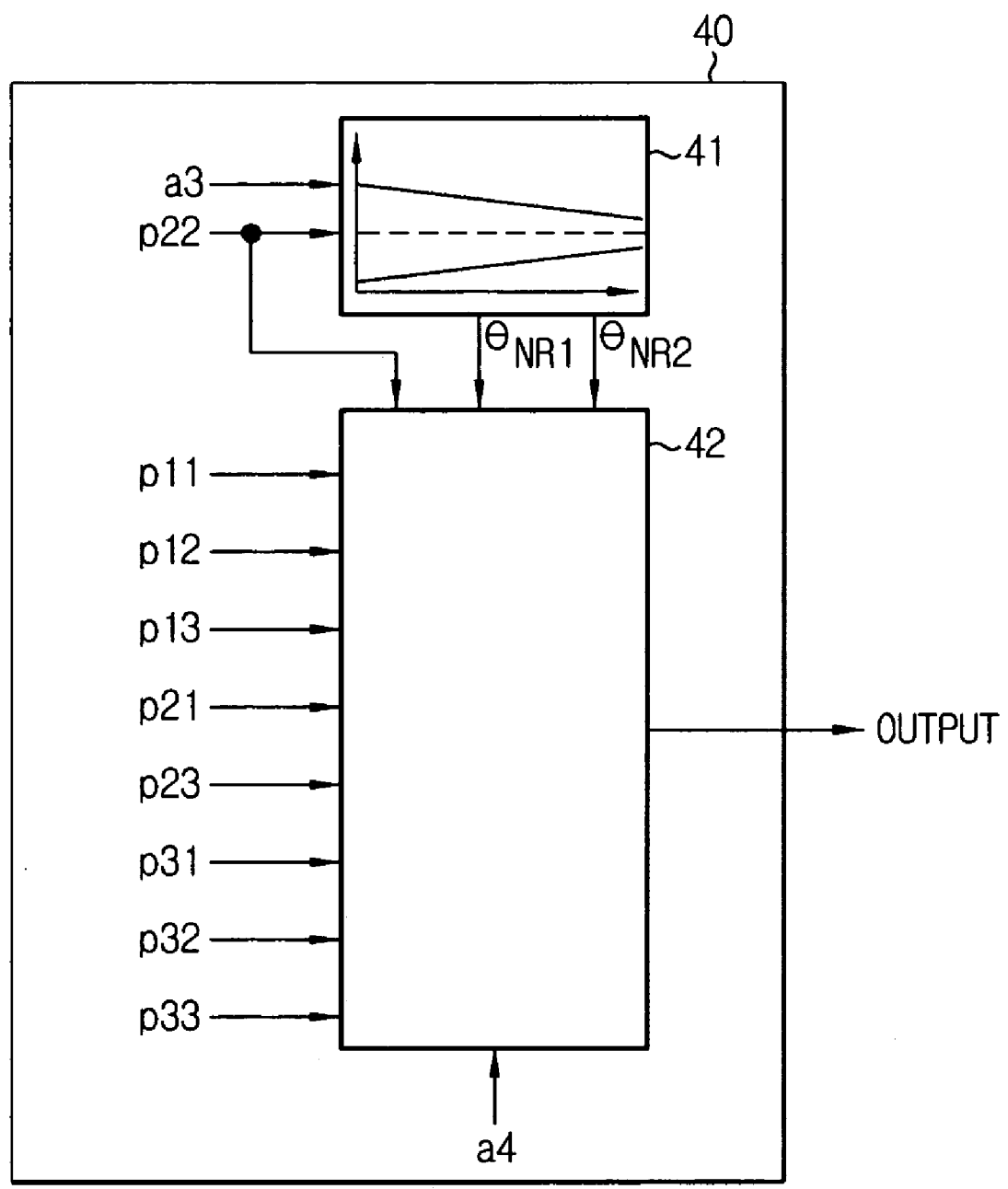
FIG. 5 is a view illustrating a noise removing unit in the apparatus of FIG. 1.
Figure 6:
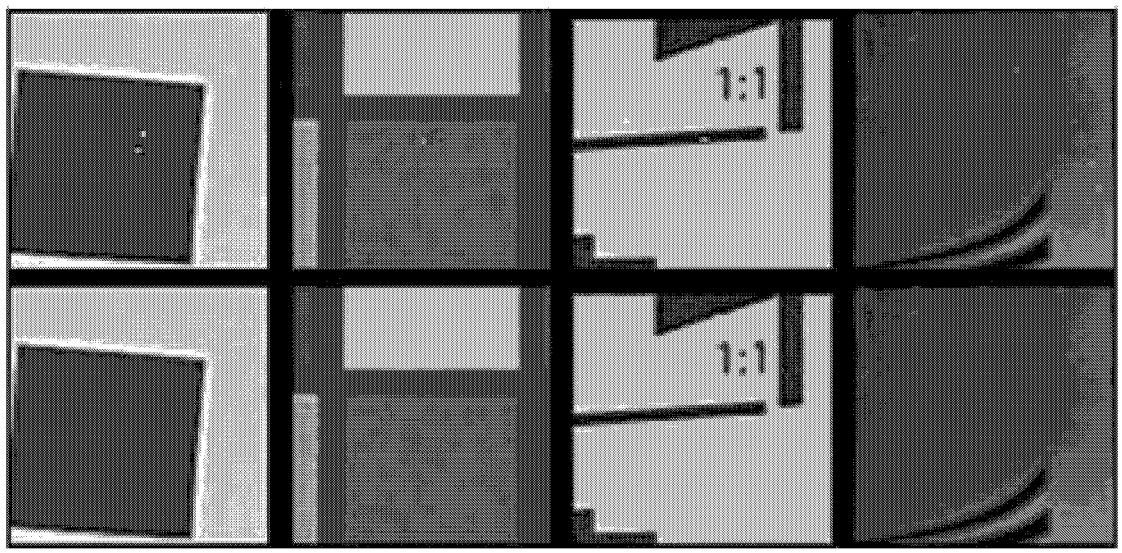
FIGS. 6 to 10 are views illustrating experimental examples by the image processing apparatus according to an embodiment of the present invention.
Figure 7:
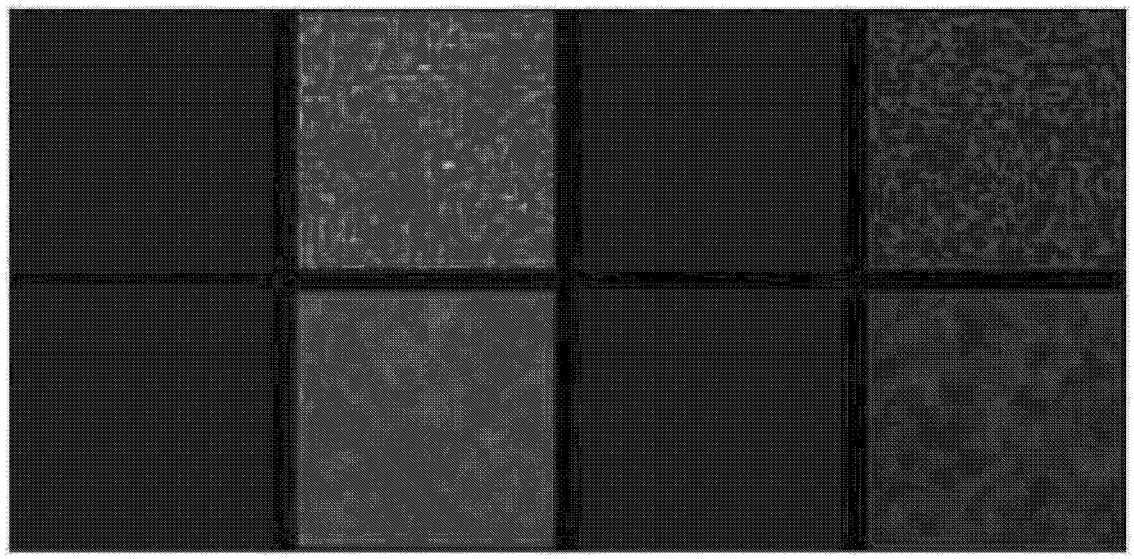
Figure 8:
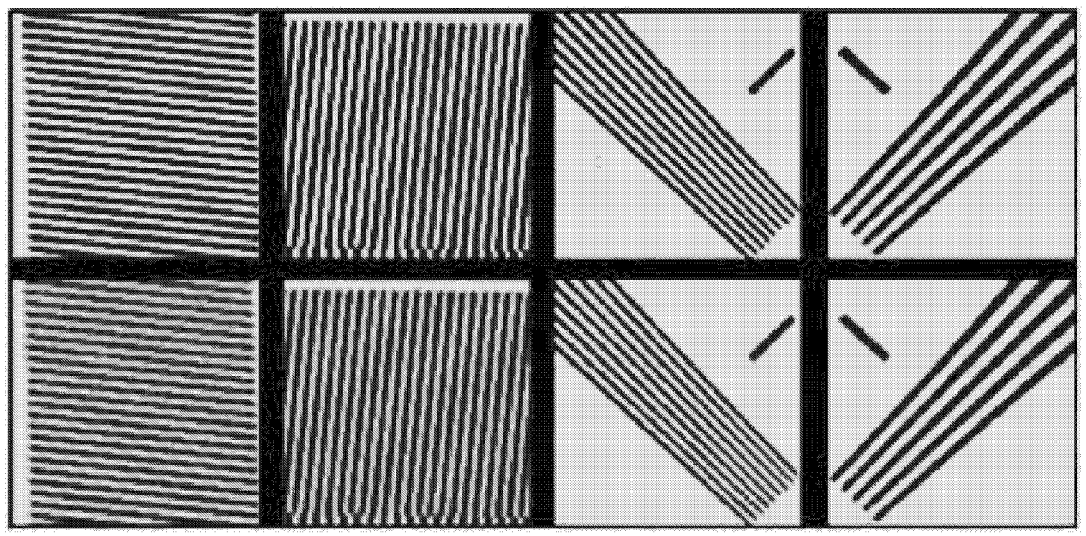
Figure 9:
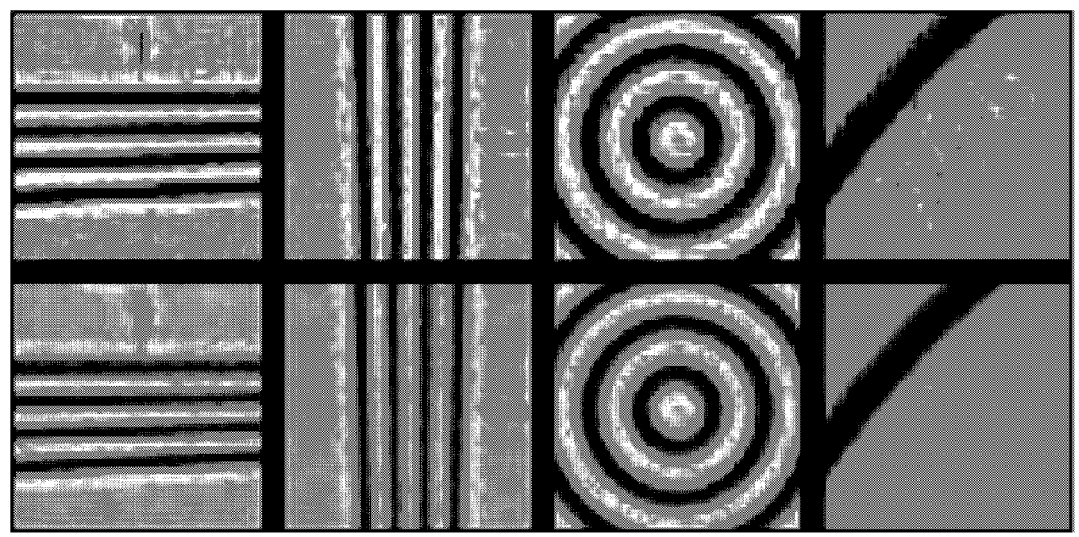
Figure 10:
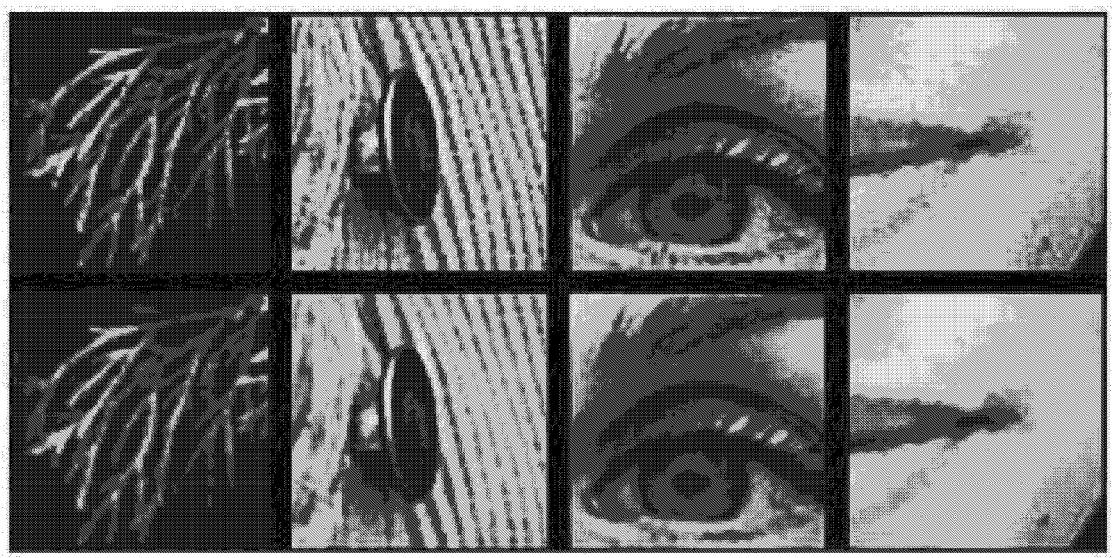

FIG. 5 is a view illustrating the noise removing unit 40 included in the apparatus of FIG. 1.

Referring to FIG. 5, the noise removing unit 40 includes a noise removal standard range generating unit 41 and a second replacing unit 42.

The noise removal standard range generating unit 41 adds a noise removal weight value (a3) to the level (p22) of the object pixel, the noise removal weight value (a3) being in inverse proportion to the level (p22) of the object pixel, to generate a noise removal standard range including a third maximum value ($\theta_{NR1}$) and a third minimum value ($\theta_{NR2}$). Methods for generating the noise removal weight value and the noise removal standard range are substantially the same as the above-mentioned methods for generating the fault pixel judgment weight value and the fault pixel judgment standard range, and thus the detailed description of the methods for generating the noise removal weight value and the noise removal standard range is replaced with the detailed description of the methods for generating the fault pixel judgment weight value and the fault pixel judgment standard range, respectively.

The second replacing unit 42 replaces the level of the object pixel with a level average value of adjacent pixels having levels (p22) that are not less than the third minimum value ($\theta_{NR2}$) and not more than the third maximum value ($\theta_{NR1}$). Preferably, the second replacing unit 42 adds a larger noise removal weight value (a4) to the object pixel than it does to the adjacent pixels. This operating principle of the second replacing unit 42 is substantially the same as the above-mentioned operating principle of the first replacing unit 33 except that a larger weight value than weight values added to the adjacent pixels is added to the object pixel, and thus the detailed description of the second replacing unit 42 is replaced with the detailed description of the first replacing unit 33.

FIGS. 6 to 10 are views illustrating comparison between image processed results by the image processing apparatus according to an embodiment of the present invention and a conventional image processing apparatus.

Referring to FIGS. 6 to 10, the image processing apparatus according to an embodiment of the present invention removes or reduces both of a fault pixel and noise effectively without blur of a heterogeneous region of an image that is caused by the fault pixel such as a hot pixel and the noise existing in the image. Thus, an image of high quality is obtained. The image processing apparatus according to an embodiment of the present invention sets a standard range adaptable to a level of each pixel, thereby removing noise effectively while maintaining flexibly a heterogeneous region of dark and light portions of an image. In particular, the image processing apparatus according to an embodiment of the present invention improves the image quality of a bayer image used as an input of a camera sensor, and thus can use the bayer image of the improved image quality as an effective input of a subsequent image processing.

FIG. 11 is a view illustrating an image processing method according to an embodiment of the present invention.

Referring to FIG. 11, the image processing method according to an embodiment of the present invention comprises an object area extracting step for extracting an object area including an object pixel and pixels adjacent to the object pixel from a bayer pattern image (S10), a fault pixel judging step for judging if the object pixel is a fault pixel on the basis of a fault pixel judgment standard range that varies according to a level of the object pixel (S20), a fault pixel correcting step for correcting the level of the object pixel judged as a fault pixel on the basis of a fault pixel correction standard range that varies according to a level average value of the adjacent pixels (S30), and a noise removing step for removing noise of the object pixel on the basis of a noise removal standard range that varies according to the level of the object (S40).

The operating principle of the image processing method according to an embodiment of the present invention is substantially the same as that of the above-mentioned image processing apparatus according to an embodiment of the present invention, and thus the detailed description of the image processing method according to an embodiment of the present invention is replaced with the detailed description of the image processing apparatus according to an embodiment of the present invention.

Only a few implementations and examples are described and other implementations, enhancements and variations can be made based on what is described and illustrated in this application.

As such, the present invention can remove a hot pixel or noise effectively while maintaining a heterogeneous region of an input image.

And, the present invention can remove a hot pixel and noise simultaneously to reduce the number of steps for image signal processing.

Also, the present invention can remove a hot pixel and noise while ensuring heterogeneous and homogeneous regions of dark and light portions in an image to the maximum.

Further, the present invention can remove a grid noise on each color channel existing in a bayer pattern.

What is claimed is:

1. An image processing apparatus, comprising:
an object area extracting unit for extracting an object area including an object pixel and pixels adjacent to the object pixel from a bayer pattern image;
a fault pixel judging unit for determining if the object pixel is a fault pixel based on levels of the adjacent pixels and a fault pixel judgment standard range that varies according to a level of the object pixel; and
a fault pixel correcting unit for correcting the level of the object pixel determined to be a fault pixel based on a level average value of the adjacent pixels and a fault pixel correction standard range that varies according to the level average value of the adjacent pixels,
wherein
the fault pixel judgment standard range is generated by applying a weight value to the level of the object pixel, where the weight value varies according to the level of the object pixel, and
the fault pixel correction standard range is generated by applying a fault pixel correction weight value to the level average value of the adjacent pixels, where the fault pixel correction weight value varies according to the level average value of the adjacent pixels.

2. The image processing apparatus according to claim 1, wherein the object area extracting unit extracts an object area for each color channel.

3. The image processing apparatus according to claim 2, wherein the object area extracting unit includes:
a G channel object area extracting unit for extracting an object area of a G channel; and
an R/B channel object area extracting unit for extracting an object area of R and B channels.

4. The image processing apparatus according to claim 1, wherein the fault pixel judging unit includes:
a fault pixel judgment standard range generating unit for generating a fault pixel judgment standard range, including a first maximum value and a first minimum value, by applying a fault pixel judgment weight value to the level of the object pixel, where the fault pixel judgment weight value varies inversely proportional to the level of the object pixel; and
a comparing/judging unit for comparing levels of the adjacent pixels with the fault pixel judgment standard range to determine if the object pixel is a fault pixel.

5. The image processing apparatus according to claim 4, wherein the comparing/judging unit identifies the object pixel as a fault pixel,
if all the levels of the adjacent pixels are equal to or larger than the first maximum value, or
if all the levels of the adjacent pixels are equal to or smaller than the first minimum value.

6. The image processing apparatus according to claim 1, wherein the fault pixel correcting unit includes:
an adjacent pixel level average value calculating unit for calculating a level average value of the adjacent pixels;
a fault pixel correction standard range generating unit for generating a fault pixel correction standard range, including a second maximum value and a second minimum value, by applying a fault pixel correction weight value to the level average value of the adjacent pixels, where the fault pixel correction weight value varies inversely proportional to the level average value of the adjacent pixels; and
a first replacing unit for replacing the level of the object pixel with a level average value of adjacent pixels having levels that are not less than the second minimum value and not more than the second maximum value.

7. The image processing apparatus according to claim 1, further comprising:
a noise removing unit for removing noise of the object pixel based on a level average value of adjacent pixels and a noise removal standard range that varies according to the level of the object pixel,
wherein the noise removal standard range is generated by applying a noise removal weight value to the level of the object pixel, where the noise removal weight value varies according to the level of the object pixel.

8. The image processing apparatus according to claim 7, wherein the noise removing unit includes:
a noise removal standard range generating unit for generating a noise removal standard range, including a third maximum value and a third minimum value, by applying the noise removal weight value to the level of the object pixel, where the noise removal weight value varies inversely proportional to the level of the object pixel; and
a second replacing unit for replacing the level of the object pixel with a level average value of adjacent pixels having levels that are not less than the third minimum value and not more than the third maximum value.

9. The image processing apparatus according to claim 8, wherein the second replacing unit applies a larger weight value to the object pixel than weight values applied to the adjacent pixels.

10. An image processing method, comprising:
an object area extracting step for extracting an object area including an object pixel and pixels adjacent to the object pixel from a bayer pattern image;
a fault pixel judging step for determining if the object pixel is a fault pixel based on levels of the adjacent pixels and a fault pixel judgment standard range that varies according to a level of the object pixel; and
a fault pixel correcting step for correcting the level of the object pixel determined to be a fault pixel based on a level average value of the adjacent pixels and a fault pixel correction standard range that varies according to the level average value of the adjacent pixels,
wherein
the fault pixel judgment standard range is generated by applying a weight value to the level of the object pixel where the weight value varies according to the level of the object pixel, and
the fault pixel correction standard range is generated by applying a fault pixel correction weight value to the level average value of the adjacent pixels where the fault pixel correction weight value varies according to the level average value of the adjacent pixels.

11. The image processing method according to claim 10, wherein, in the object area extracting step, each object area for each color channel is extracted.

12. The image processing method according to claim 11, wherein the object area extracting step includes:
a G channel object area extracting step for extracting an object area of a G channel; and
an R/B channel object area extracting step for extracting an object area of R and B channels.

13. The image processing method according to claim 10, wherein the fault pixel judging step includes:
a fault pixel judgment standard range generating step for generating a fault pixel judgment standard range, including a first maximum value and a first minimum value, by applying a fault pixel judgment weight value to the level of the object pixel, where the fault pixel judgment weight value varies inversely proportional to the level of the object pixel; and a comparing/judging step for comparing the levels of the adjacent pixels with the fault pixel judgment standard range to determine if the object pixel is a fault pixel.

14. The image processing method according to claim 13, wherein, in the comparing/judging step, the object pixel is determined to be a fault pixel, if all the levels of the adjacent pixels are equal to or larger than the first maximum value, or if all the levels of the adjacent pixels are equal to or smaller than the first minimum value.

15. The image processing method according to claim 10, wherein the fault pixel correcting step includes:

an adjacent pixel level average value calculating step for calculating a level average value of the adjacent pixels;

a fault pixel correction standard range generating step for generating a fault pixel correction standard range, including a second maximum value and a second minimum value, by applying a fault pixel correction weight value to the level average value of the adjacent pixels, where the fault pixel correction weight value varies inversely proportional to the level average value of the adjacent pixels; and a first replacing step for replacing the level of the object pixel with a level average value of adjacent pixels having levels that are not less than the second minimum value and not more than the second maximum value.

16. The image processing method according to claim 10, further comprising:

a noise removing step for removing noise of the object pixel based on a level average value of adjacent pixels and a noise removal standard range that varies according to the level of the object pixel, wherein the noise removal standard range is generated by applying a noise removal weight value to the level of the object pixel, where the noise removal weight value varies according to the level of the object pixel.

17. The image processing method according to claim 16, wherein the noise removing step includes:

a noise removal standard range generating step for generating the noise removal standard range, including a third maximum value and a third minimum value, by applying a noise removal weight value to the level of the object pixel, where the noise removal weight value varies inversely proportional to the level of the object pixel; and a second replacing step for replacing the level of the object pixel with a level average value of adjacent pixels having levels that are not less than the third minimum value and not more than the third maximum value.

18. The image processing apparatus according to claim 17, wherein, in the second replacing step, a larger weight value is applied to the object pixel than weight values applied to the adjacent pixels.

* * * * *